United States Patent
Takida et al.

Patent Number: 5,159,013
Date of Patent: Oct. 27, 1992

[54] HALOGEN-CONTAINING THERMOPLASTIC RESIN COMPOSITION

[75] Inventors: Hiroshi Takida, Takatsuki; Teruo Iwanami, Ibaraki, both of Japan

[73] Assignee: Nippon Gohsei Kagaku Kogyo Kabushiki, Osaka, Japan

[21] Appl. No.: 381,355

[22] Filed: Jul. 18, 1989

[30] Foreign Application Priority Data

Jul. 19, 1988 [JP] Japan ............... 63-179395

[51] Int. Cl.⁵ ............ C08K 5/04; C08K 5/36; C08L 29/04
[52] U.S. Cl. ...................... 525/57; 525/58
[58] Field of Search ................. 525/57, 58

[56] References Cited

U.S. PATENT DOCUMENTS

| | | | |
|---|---|---|---|
| 4,717,618 | 1/1988 | Tse et al. | 525/57 |
| 4,788,243 | 11/1988 | Soerens | 524/503 |
| 4,972,012 | 11/1990 | Amano et al. | 524/180 |
| 5,051,462 | 9/1991 | Takida et al. | 524/394 |

FOREIGN PATENT DOCUMENTS 52-69955 6/1977 Japan.
60-238345 11/1985 Japan.

*Primary Examiner*—Ana L. Carrillo
*Attorney, Agent, or Firm*—Armstrong, Nikaido, Marmelstein, Kubovcik & Murray

[57] ABSTRACT

This invention provides a halogen-containing thermoplastic resin composition comprising a halogen-containing thermoplastic resin (A), a melt-moldable vinyl alcohol polymer (B) and a polyesteramide (C), the proportions of (B) and (C) being 0.1 to 100 parts by weight and 0.1 to 10 parts by weight, respectively, based on 100 parts by weight of (A). The component (C) improves the compatibility between the components (A) and (B).

3 Claims, No Drawings

HALOGEN-CONTAINING THERMOPLASTIC RESIN COMPOSITION

BACKGROUND OF THE INVENTION

This invention relates to a halogen-containing thermoplastic resin composition excelling in processability, appearance, strength, hydrophilicity, resistance to oil and solvents and gas barrier property.

Halogen-containing thermoplastic resins, represented by polyvinyl chloride, are not only comparatively inexpensive but also have excellent clarity and mechanical properties and have therefore been used in a variety of applications, such as films, sheets, hoses, flexible containers, coated fabric, artificial leather, tarpaulins, shoe bottoms, sponges, electrical wire sheathing, living necessities and so on.

Having the above-mentioned advantages on the one hand, halogen-containing thermoplastic resins have disadvantages, on the other hand, in that they are not satisfactory in processability, hydrophilicity, resistance to oil and solvents, gas barrier property and adhesiveness to substrates.

In order to improve the processability, hydrophilicity and other properties of halogen-containing thermoplastic resins, it has been practiced to polymer-blend these resins with a modifying resin such as a hydrolyzed ethylene-vinyl acetate copolymer.

By way of example, Japanese Patent Application KOKAI No. 69955/1977 discloses a polyvinyl chloride barrier packaging composition essentially comprising a mixture of a vinyl chloride polymer and an ethylene-vinyl alcohol copolymer, the proportion of which is 10 to 30 weight percent based on the vinyl chloride polymer.

Japanese Patent Application KOKAI No. 238345/1985 describes a resin composition comprising (a) a thermoplastic resin (including polyvinyl chloride), (b) a hydrolyzed ethylene-vinyl acetate copolymer, and (c) a salt or an oxide containing at least one element selected from the group consisting of the elements of Groups I, II and III of Periodic Table of the Elements and mentions that this composition has remarkably improved compatibility.

However, although the addition of a hydrolyzed ethylene-vinyl acetate copolymer to a halogen-containing thermoplastic resin results in improvements in hydrophilicity, resistance to oil and solvents and gas barrier property, the inherent poor compatibility of the two resins makes long-run molding difficult and, moreover, the products obtainable therefrom by melt molding have foreign matter and discoloration problems and poor mechanical properties.

The composition according to Japanese Patent Application KOKAI No. 238345/1985 referred to above has improved compatibility but the degree of improvement by addition of a salt or oxide has its own limit and it still has much room for improvement.

The object of this invention is to solve the above-mentioned problems by employing a polymer-type compatibility-improving agent in adding a vinyl alcohol polymer to a halogen-containing thermoplastic resin for improving its properties.

SUMMARY OF THE INVENTION

This invention is therefore directed to a halogen-containing thermoplastic composition comprising a halogen-containing thermoplastic resin (A), a melt-moldable vinyl alcohol polymer (B) and a polyesteramide (C), the proportions of (B) and (C) being 0.1 to 100 parts by weight and 0.1 to 10 parts by weight, respectively, based on 100 parts by weight of (A).

DETAILED DESCRIPTION OF THE INVENTION

This invention is described in further detail hereinafter.

Halogen-containing thermoplastic resin (A)

As examples of halogen-containing thermoplastic resin (A), there may be mentioned polyvinyl chloride resin, polyvinylidene chloride resin, chlorinated polyethylene, chlorinated polypropylene, chlorinated polyethylene-vinyl acetate copolymer and chlorosulfonated polyethylene. Particularly useful are polyvinyl chloride type resins, i.e. vinyl chloride homopolymer and copolymers of vinyl chloride with other comonomers.

Vinyl alcohol polymer (B)

The vinyl alcohol polymer (B) includes, among others, melt-moldable vinyl alcohol homopolymers and copolymers, such as polyvinyl alcohols of comparatively low degrees of polymerization, partial hydrolyzates of polyvinyl acetate, post-modification (acetalized, ketalized and cyanoetherized) products of polyvinyl alcohols, and hydrolyzed copolymers of vinyl acetate with copolymerizable monomers (for example, olefins, such as ethylene, propylene, α-octene and α-dodecene, unsaturated carboxylic acids, their salts, partial or complete esters, nitrils, amides and anhydrides, unsaturated sulfonic acids and their salts, and vinyl esters other than vinyl acetate). It should be understood, however, that the proportion of the monomer or monomers copolymerizable with vinyl acetate should not be more than 30 mole percent, except that, in the case of ethylene, its proportion should not exceed 75 mole percent.

Among the above-mentioned polymers, a hydrolyzed ethylene-vinyl acetate copolymer with an ethylene content of 20 to 75 mole percent (preferably 25 to 60 mole percent) and a degree of saponification of vinyl acetate being not less than 50 mole percent (preferably not less than 70 mole percent) is the most useful. The vinyl alcohol polymers outside the above copolymer composition are inadequate in the potential to improve the properties of halogen-containing thermoplastic resin (A). It should also be understood that as long as the above-mentioned range of copolymer composition is met, the vinyl alcohol polymer (B) may contain other comonomers in minor proportions.

Among those vinyl alcohol polymers (B), a low-ash, low-alkali metal vinyl alcohol polymer with a melting point not exceeding 200° C. and ash and alkali metal contents not exceeding certain limits is particularly useful.

Since the halogen-containing thermoplastic resin (A) is generally molded at a temperature not higher than 200° C., any vinyl alcohol polymer (B) with a melting point exceeding 200° C. will not be completely dispersed in (A) and, hence, the physical properties of the resulting product may not be fully satisfactory.

Moreover, if the ash content and alkali metal content of (B) exceed a certain limit, the halogen-containing thermoplastic resin (A) and the polyesteramide (C) to be described below are liable to undergo discoloration and decomposition.

The hydrolyzed vinyl acetate copolymer can generally be prepared by hydrolyzing (saponifying) a vinyl acetate copolymer with the aid of an alkali catalyst. However, the industrial water and reagents used generally contain metal salts as impurities and the saponification catalyst (an alkali metal hydroxide) remains as the alkali metal acetate after the reaction, with the result that such impurities and alkali metal acetate tend to be contained in the saponified polymer and are separated by precipitation and filtration from the saponification reaction mixture. Though it depends on various factors such as the comonomer content of the resin, degree of saponification, conditions of saponification reaction, etc., the ash and alkali metal contents of the hydrolyzed vinyl acetate copolymer so obtained are usually about 5,000 to 50,000 ppm and about 4,000 to 40,000 ppm, respectively.

In the production of polyvinyl alcohol or post-modification product of polyvinyl alcohol, an acid or an alkali is used as catalysts of the hydrolysis reaction. In the case of an acid catalyst, metal hydroxide or carbonate is employed in neutralization process after hydrolysis, so the substantial amount of alkali metal is also included in the products.

The terms 'ash content' are used herein to mean the value found as follows. The hydrolyzed vinyl acetate copolymer is dried, taken in a platinum evaporating dish and carbonized by means of an electric heater and a gas burner. The carbonized resin is then charged into an electric furnace at 400° C. The furnace is then heated-up to 700° C., at which temperature the resin is thoroughly reduced to ashes in 3 hours. The ashes are taken out from the furnace, allowed to cool in 5 minutes and further allowed to stand in a desiccator for 25 minutes. Finally, the ashes were accurately weighed.

The terms 'alkali metal content' are used herein to mean the value found as follows. After the hydrolyzed vinyl acetate copolymer is reduced to ashes as in the determination of ash content, the ashes are dissolved in an aqueous solution of hydrogen chloride under warming and the solution is subjected to atomic absorption spectrometry.

The vinyl alcohol polymer, particulary the hydrolyzed ethylene-vinyl acetate copolymer, to be used in accordance with the invention preferably has an ash content, as determined by the above procedure, not more than 300 ppm, more desirably not more than 50 ppm, and for still better results not more than 20 ppm and an alkali metal content, also as determined by the above-described procedure, not more than 200 ppm, more desirably not more than 35 ppm, and for still better results not more than 5 ppm. The ash and alkali metal contents are preferably as low as possible within the respective ranges mentioned above but because of various limitations imposed on purification in commercial production, the practical lower limits are about 1 ppm for ashes and about 0.5 ppm for alkali metal.

The aforementioned ash- and alkali metal-lean vinyl alcohol polymer can be prepared as follows. The powders, granules or pellets of vinyl alcohol polymer obtained are washed thoroughly with an aqueous or organic solvent (e.g. methanol) solution of acid, preferably a weak acid, to remove the salt responsible for said ashes and alkali metal and are then preferably washed with water or organic solvent such as methanol to remove the absorbed acid from the resin and dried.

Incidentally, the water to be used in the preparation of aqueous solutions or in the washing procedure is deionized water and the same applies to the following description.

As examples of the weak acid mentioned above, there may be mentioned acetic acid, propionic acid, glycolic acid, lactic acid, adipic acid, azelaic acid, glutaric acid, succinic acid, benzoic acid, isophthalic acid, terephthalic acid and so on. Generally, a weak acid with a pKa value not less than 3.5 at 25° C. is preferred.

After the above weak acid treatment and either before or after washing with a water or organic solvent, there is preferably carried out a further treatment with a dilute aqueous or organic solvent (e.g. methanol) solution of strong acid, for example an organic acid with a pKa value not exceeding 2.5 at 25 C., such as oxalic acid, maleic acid, etc., or mineral acids such as phosphoric acid, sulfuric acid, nitric acid, hydrochloric acid and so on. By this strong acid treatment, removal of the alkali metal can be made more effectively.

Polyesteramide (C)

The polyesteramide (C) is a polymer which contains, in its backbone chain, ester and amide bonds, in some cases, even ether bonds and can for example be produced by any of the following processes.

(1) The process in which a dicarboxylic acid, a glycol (including a glycol having an ether group; the same applies hereinafter) and an aminocarboxylic acid or lactam are first reacted under heating in the presence of an esterification catalyst and, then, caused to undergo thermal polycondensation under reduced pressure.

(2) The process in which a dicarboxylic acid and a glycol are first reacted under esterifying conditions to give a polyester prepolymer which is then caused to undergo polycondensation with an aminocarboxylic acid or a lactam under reduced pressure.

(3) The process in which an aminocarboxylic acid or a lactam is first polymerized to give a polyamide oligomer which is then used in lieu of a part or all of the aminocarboxylic acid or lactam in the above process (1) or (2).

(4) The process in which an aminocarboxylic acid or a lactam is first reacted with a dicarboxylic acid to give a polyamide prepolymer with a free carboxyl group at either terminus which is then reacted with a glycol under reduced pressure.

Among the above-mentioned alternative processes, the process giving a block type polyesteramide is preferred.

As examples of said dicarboxylic acid, there may be mentioned dicarboxylic acids containing 4 or more carbon atoms, namely aromatic dicarboxylic acids such as terephthalic acid, isophthalic acid, naphthalene-2,7-dicarboxylic acid, diphenyl-4,4'-dicarboxylic acid, diphenoxyethanedicarboxylic acid, sodium 3-sulfoisophthalate, etc., alicyclic dicarboxylic acids such as 1,4-hexanedicarboxylic acid, 1,2- or 1,4-cyclohexanedicarboxylic acid, cyclohexyl-4,4'-dicarboxylic acid, etc., and aliphatic dicarboxylic acids such as succinic acid, oxalic acid, adipic acid, sebacic acid, decanedicarboxylic acid and so on. Of these dicarboxylic acids, terephthalic acid, isophthalic acid, adipic acid, 1,4-cyclohexanedicarboxylic acid, sebacic acid and decanedicarboxylic acid are particularly useful.

As examples of the glycol, there may be mentioned 1,4-butanediol, polyethylene glycol, polypropylene glycol, polybutylene glycol, polyhexylene glycol, ethylene oxide-propylene oxide block or random copolymer and so on. The molecular weight of the glycol may preferably range from about 80 to 6,000. Of these glycols, 1,4-butanediol and polybutylene glycol are particularly preferred.

As the aminocarboxylic acid or lactam, the compound containing 6 or more carbon atoms is employed. Thus, for example, ω-aminocaproic acid, ω-aminoenanthic acid, ω-aminocapric acid, ω-aminopelargonic acid, ω-aminocapric acid, 11-aminoundecanoic acid, 12-aminododecanoic acid, caprolactam, enantholactam, ω-caprylolactam, ω-laurolactam, hexamethylenediamine adipate, hexamethylenediamine sebacate, hexamethylenediamine isophthalate, undecamethylenediamine adipate and so on. Among these compounds, 11-aminoundecanoic acid, 12-aminododecanoic acid and caprolactam are particularly useful.

The melting point of polyesteramide (C) is preferably in the range of about 70° to 200° C.

The amide content of polyesteramide (C) is preferably in the range of 10 to 90 mole percent. Outside of this range, the compatibility-improving effect will not be sufficient.

Compounding formula

Based on 100 parts by weight of halogen-containing thermoplastic resin (A), the vinyl alcohol copolymer (B) is used in a proportion of 0.1 to 100 parts by weight and the polyesteramide (C) is used in a proportion of 0.1 to 10 parts by weight. Preferred are 0.5 to 50 parts by weight of vinyl alcohol polymer (B) and 0.5 to 5 parts by weight of polyesteramide (C) based on 100 parts by weight of halogen-containing thermoplastic resin (A). The ratio of vinyl alcohol copolymer (B) to polyesteramide (C) is not critical but is preferably B/C=about 20–0.1 by weight.

If the proportion of vinyl alcohol polymer (B) is too small, the improving effect on the properties of halogen-containing thermoplastic resin (A) will not be sufficient, while the use of vinyl alcohol polymer (B) in excess of the above-mentioned range will detract from the inherent useful properties of halogen-containing thermoplastic resin (A).

If the proportion of polyesteramide (C) is too small, the compatibility between halogen-containing thermoplastic resin (A) and vinyl alcohol polymer (B) will not be improved so that moldability and the appearance and physical properties of moldings will not be satisfactory. On the other hand, the use of polyesteramide (C) in excess will detract from the improving effect of vinyl alcohol polymer (B) on the properties of halogen-containing thermoplastic resin (A).

Other additives

The halogen-containing thermoplastic resin composition of this invention may include, in addition to the above-described components, other additives which are conventionally used for halogen-containing thermoplastic resin, such as plasticizers, antioxidants, stabilizers, auxiliary stabilizers, ultraviolet absorbers, dyes and pigments, fillers, lubricants, antistatic agents, surfactants, chelating agents, reinforcing materials, foaming agents, flame retardants, impact resistance improving agents and so on. Furthermore, unless the object and effect of this invention are not jeopardized, other kinds of thermoplastic resins can also be incorporated.

Melt-molding

As the melt-molding techniques that can be employed, any of calendering, extrusion molding, injection molding and blow molding methods can be employed.

EFFECTS OF THE INVENTION

The addition of polyesteramide (C) to a molding compound consisting of halogen-containing thermoplastic resin (A) and vinyl alcohol polymer (B) in accordance with this invention results in an effective improvement in the compatibility between (A) and (B), so moldability is improved and the improving effect of (B) on the properties of (A) is remarkably realized.

Therefore, in calendering, the problem of "plate-out" is eliminated, while extrusion molding can be continuously carried out over a long run. Moreover, the discoloration of moldings is effectively retarded and the appearance and physical properties of moldings are remarkably improved.

Therefore, this invention contributes much to plastic molding industry, particularly in the field of halogen-containing thermoplastic resins such as polyvinyl chloride resin.

EXAMPLES

The following examples are further illustrative of this invention. In the examples, all parts and percents (%) are by weight unless otherwise indicated.

Provision of materials

As the halogen-containing thermoplastic resin (A), vinyl alcohol polymer (B) and polyester amide (C), the following materials were provided.

Halogen-containing thermoplastic resin (A)

(A-1) Polyvinyl chloride (degree of polymerization: 800)

(A-2) Methyl acrylate-vinylidene chloride copolymer (methyl acrylate content: 7 mole %)

Vinyl alcohol polymer (B)

(B-1) Hydrolyzed ethylene-vinyl acetate copolymer (ethylene content 44 mole %, degree of saponification of vinyl acetate 99.5 mole %, m.p. 167° C., ash content 6 ppm, sodium metal content 2.7 ppm)

(B-2) Hydrolyzed ethylene-vinyl acetate copolymer (ethylene content 55 mole %, degree of saponification of vinyl acetate 79.0 mole %, m.p. 111° C., ash content 15 ppm, sodium metal content 4.0 ppm)

(B-3) Hydrolyzed dedecene-1-vinyl acetate copolymer (dodecene-1 content 5.5 mole %, degree of saponification of vinyl acetate 99.3 mole %, m.p. 187° C., ash content 215 ppm, sodium metal content 140 ppm)

(B-4) Polyvinyl alcohol (degree of polymerization 500, degree of saponification 70.0 mole %, m.p. 170° C., ash content 120 ppm, sodium metal content 70 ppm)

Polyester amide (C)

(C-1) Polyester amide with a melting point of 120° C. and an amide content of 40 mole % (ester moiety: terephthalic acid/adipic acid (mole ratio 6:4) and 1,4-butanediol; amide moiety: ε-caprolactam)

(C-2) Polyester amide with a melting point of 145° C. and an amide content of 60 mole % [the same raw materials as (C-1)]

Formulation and molding conditions

Using the above materials in the proportions indicated in Table 1, preliminary compounding was carried out and, then, the respective compounds were extrusion-molded under the conditions described hereinafter.

In the case where halogen-containing thermoplastic resin (A) was polyvinyl chloride, the compounding formula and molding conditions were set as follows.

| (Compounding formula) | |
|---|---|
| Polyvinyl chloride (A) | 100 Parts |
| Epoxidized soybean oil | 3 Parts |
| Calcium stearate | 0.5 Part |
| Zinc stearate | 0.5 Part |
| Stearoylbenzoylmethane | 0.2 Part |
| Vinyl alcohol polymer (B) | As indicated |
| Polyesteramide (C) | As indicated |
| (Extrusion molding conditions) | |
| Extruder: a 30 mm (dia.) extruding machine | |
| T die: 200 mm wide, sheet thickness 0.3 mm | |
| Screw: Full-flighted, constant pitch, L/D = 20, compression ratio 3.0, rotational speed 30 rpm. | |
| Temperature: C1: 130° C., C2: 175° C., C3: 180° C. H: 170° C., D: 180° C. | |
| Screen: 80 mesh × 2 | |
| Take-off roll: 85–90° C. | |

When the halogen-containing thermoplastic resin (A) is a methyl acrylate-vinylidene chloride copolymer, the compounding formula and extrusion molding conditions were set as follows.

| (Compounding formula) | |
|---|---|
| Methyl acrylate-vinylidene chloride copolymer | 100 Parts |
| Epoxidized soybean oil | 3 Parts |
| Calcium stearate | 0.5 Part |
| Zinc stearate | 0.5 Part |
| Stearoylbenzoylmethane | 0.2 Part |
| Vinyl alcohol polymer (B) | As indicated |
| Polyesteramide (C) | As indicated |
| (Molding conditions) | |
| Extruder: a 40 mm (dia.) extruding machine | |
| Screw: L/D = 23, compression ratio 3.2 | |
| Die temperature: 170° C. | |

The other conditions are same as above-mentioned.

Conditions and results

The conditions and results are shown in Table 1. The determination and evaluation were made as follows.

The extrusion-moldability was evaluated in terms of draw-down, change in torque and other abnormalities during 8-hour continuous molding.

The appearance of extrusion-molded testpieces were evaluated after 8-hour continuous molding in terms of discoloration, fisheyes (FE), streaks and so on.

The total light transmittance was measured in accordance with JIS K 6745 (1 mm-thick sheet).

As to impact strength, Izod impact strength was measured in accordance with JIS K 7110.

The discharge half-time was measured with an honestmeter.

TABLE 1

| | Compounding formula Component/parts | | Molding trouble | Appearance of product | Total light transmittance (%) | Impact strength (kg · cm/cm$^2$) | Discharge half-time (sec.) |
|---|---|---|---|---|---|---|---|
| Example 1 | A-1 | 100 | No trouble | Coloration: None | 81 | 7 | 28 |
| | B-1 | 30 | | FE: None | | | |
| | C-1 | 5 | | Streaks: None | | | |
| Example 2 | A-1 | 100 | No trouble | Coloration: None | 78 | 6 | 13 |
| | B-2 | 40 | | FE: None | | | |
| | C-2 | 4 | | Streaks: None | | | |
| Example 3 | A-1 | 100 | No trouble | Coloration: None | 84 | 6 | 35 |
| | B-3 | 5 | | FE: None | | | |
| | C-1 | 2 | | Streaks: None | | | |
| Example 4 | A-1 | 100 | No trouble | Coloration: None | 83 | 5 | 25 |
| | B-4 | 10 | | FE: None | | | |
| | C-2 | 2 | | Streaks: None | | | |
| Example 5 | A-2 | 100 | No trouble | Coloration: None | 79 | 8 | 20 |
| | B-1 | 40 | | FE: None | | | |
| | C-1 | 4 | | Streaks: None | | | |
| Comparative Example 1 | A-1 | 100 | Icicle, flow mark, surge | Coloration: Yellow FE: Multiple Streaks: burred | 53 | 3 | 110 |
| | B-1 | 30 | | | | | |
| Comparative Example 2 | A-1 | 100 | Icicle, flow mark, surge | Coloration: Yellow FE: Multiple Streaks: burred | 50 | 2 | 80 |
| | B-2 | 40 | | | | | |
| Comparative Example 3 | A-1 | 100 | Icicle, flow mark, surge | Coloration: Yellow FE: Multiple Streaks: burred | 55 | 3 | 200 |
| | B-3 | 5 | | | | | |
| Comparative Example 4 | A-1 | 100 | Icicle, flow mark, surge | Coloration: Yellow FE: Multiple Streaks: burred | 52 | 2 | 140 |
| | B-4 | 10 | | | | | |
| Comparative Example 5 | A-2 | 100 | Icicle, flow mark, surge | Coloration: Yellow FE: Multiple Streaks: burred | 51 | 2 | 90 |
| | B-1 | 40 | | | | | |

What is claimed is:

1. A halogen-containing thermoplastic resin composition comprising a halogen-containing thermoplastic resin (A) selected from the group consisting of polyvinylidene chloride, chlorinated polyethylene sulfochlorinated polyethylene, chlorinated polypropylene and homopolymers and copolymers of vinyl chloride, a low-ash, low alkali metal hydrolyzed ethylene-vinyl acetate copolymer (B) with an ethylene content of 20 to 75 mole percent, a degree of saponification of vinyl acetate not less than 70 mole percent, a melting point not exceeding 200° C., an ash content not exceeding 300 ppm, and an alkali metal content not exceeding 200 ppm, and a polyesteramide (C), the proportions of (B) and (C) being 0.5 to 50 parts by weight and 0.1 to 10 parts by weight, respectively, based on 100 parts by weight of (A).

2. A composition according to claim 1, wherein said halogen-containing thermoplastic resin (A) is polyvinyl chloride.

3. A composition according to claim 1, wherein said polyesteramide (C) is a polyesteramide with an amide content of 10 to 90 percent.

* * * * *